United States Patent [19]

Honmann

[11] Patent Number: 4,596,284

[45] Date of Patent: Jun. 24, 1986

[54] REGENERATIVE HEAT RECAPTURING DEVICE

[76] Inventor: Winfried Honmann, Günzelburgweg 4, D-7000 Stuttgart 30, Fed. Rep. of Germany

[21] Appl. No.: 664,790

[22] Filed: Oct. 25, 1984

[30] Foreign Application Priority Data

Oct. 25, 1983 [DE] Fed. Rep. of Germany ....... 3338655

[51] Int. Cl.⁴ ............................................. F23L 15/02
[52] U.S. Cl. .......................................... 165/8; 237/46; 98/33.1
[58] Field of Search ..................... 165/8, 6, DIG. 2, 4; 237/55, 46; 98/33 R, 33 A, 33.1

[56] References Cited

FOREIGN PATENT DOCUMENTS 708369 5/1954 United Kingdom ..................... 165/8
663971 5/1979 U.S.S.R. .................................. 165/8

Primary Examiner—Henry Bennett
Attorney, Agent, or Firm—Antonelli, Terry & Wands

[57] ABSTRACT

The regenerative heat recapturing device for the vertical insertion into a roof of a building or the like serving for the ventilation of space and recapturing of heat. It has a rotatingly drivable storage mass which is located partly in an intake air channel and partly in an exhaust air channel. Fan wheels are disposed in these channels. The storage mass is disposed in a storage mass ring through the inside space of which an exhaust air channel section and an intake air channel section lead axially which are always connected by way of a 180° intermediate channel section with the channel sections of the exhaust air channel or the intake air channel containing the storage mass.

11 Claims, 1 Drawing Figure

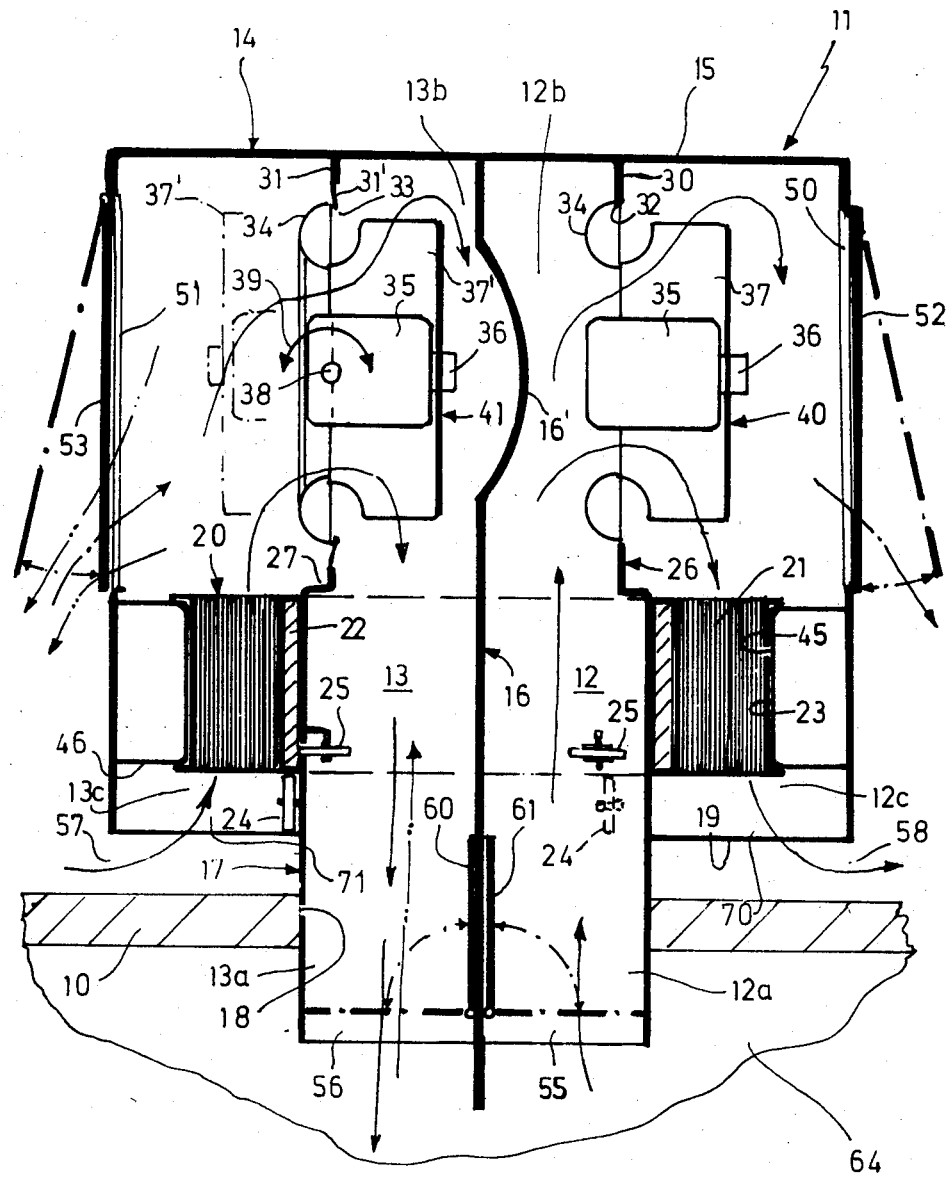

REGENERATIVE HEAT RECAPTURING DEVICE

The invention relates to a regenerative heat recapturing device serving for the ventilation of spaces and recapturing of heat. The device is adopted to be vertically inserted into the roof of a building or the like for ventilating space within the building.

A heat recapturing device serving for the direct ventilation of rooms has been known (German Pat. No. 27 13 424) which has two straight channels parallel to one another for the intake air and the exhaust air. Always one axial fan has been disposed in each of these two channels for the conveying of the intake air and the exhaust air. Furthermore, this heat recapturing device has a rotatably drivable disc-shaped storage mass which is located partly in the channel for the intake air and partly in the channel for the exhaust air and which serves for the transfer of heat between the exhaust air and the intake air. This heat recapturing device is built perpendicularly into a flat roof of the space to be aired and blows out the exhaust air perpendicularly downwards. On the other hand, it sucks in the intake air through radial openings at the upper end of the intake air channel disposed in the peripheral wall of the channel. This heat recapturing device has a relatively large axial length. Also when it rains, much rainwater may reach its perpendicular intake air channel water then unavoidably penetrates into the storage mass. When the exhaust air fan is switched off, rainwater also is able to penetrate into the exhaust air channel and it will then drop onto the storage mass in a downward direction and may flow right through it into the space. Therefore, additional measures are required in order to protect this heat recapturing device against the intrusion of rain. It also needs an opening in the roof, the diameter of which is almost as great as that of the storage mass.

It is one task of the invention to create a regenerative heat recapturing device of the initially cited type which is protected against the intrusion of rain in the case of a simple, compact and reasonably priced construction without additional measures and which will do with relatively small openings in the roof.

According to the invention, this task will be solved by a regenerative heat recapturing device comprising a rotatingly drivable storage mass through which air may flow axially, means defining an air intake channel and an exhaust air channel, said mass being located partly in said intake air channel and partly in said exhaust air channel of the heat recapturing device, respective fan means disposed in each of said intake air channel and said exhaust air channel for the conveyance of the intake air and of the exhaust air, and wherein said storage mass is disposed in a storage mass ring, through the middle opening of which an upstream section of the exhaust air channel and a downstream section of the intake air channel lead through axially, through which exhaust air and intake air may flow in counterdirection, wherein the upstream exhaust air channel section is connected by way of a 180° intermediate channel section with a downstream channel section of the exhaust air channel containing storage mass of the storage mass ring and the downstream section of the intake air channel is connected by way of a 180° intermediate channel section with an upstream channel section of the intake air channel containing storage mass of the storage mass ring.

In the case of the heat recapturing device of the invention and in consequence of the 180° reversal of the intake air channel and of the exhaust air channel, their inlet or outlet openings are located below the storage mass ring, so that as a result of it and in the case of a switched off fan, both channels are protected reliably against intrusion of rainwater. Whenever the fans are switched on, the air sucked into the intake air channel to be sure is capable, under certain circumstances, to still carry along rainwater, however, the latter does not act from above upon the storage mass, as in the case of the known heat recapturing device, but from below so that as a result of that, possibly only a relatively small portion of rainwater, if any at all, will be able to reach the storage mass and said rainwater will then not have the tendency either of penetrating right through storage mass as a result of the effect of gravity, but it will be inclined to drip off again from the storage mass or, whenever storage mass acted upon by rainwater reaches the exhaust air channel, the exhaust air will blow this rainwater out of the storage mass toward the downward opening of the exhaust channel.

This regenerative heat recapturing device of the invention is therefore well protected against rain due to its type of construction, so that no additional protective measures against rain are required.

The regenerative heat recapturing device of the invention also has a compact construction, requires only a relatively short axial construction length and makes possible good, effective degrees of heat exchange. It is especially and eminently suited also for the purpose of ventilating a space located directly below the peertinent roof, whereby its exhaust air-inlet and its intake air-outlet need to protrude downward only a little over or not at all from the roof of the pertinent space. It is however also possible to connect its intake air-outlet and exhaust air-inlet by way of air channels to at least one space not bordering the roof. It also requires only relatively small roof openings in the case of a given volume of the storage mass, since its diameters need to be no larger than those of the central opening of the storage mass ring.

The fan wheels may be disposed in a spacesaving manner in the 180° intermediate sections of the channel and preferably they may be radial fan wheels. However, other arrangements and developments of the fans or of their fan wheels are also possible, for example, their development as axial fans and for example their disposal below the storage mass ring. However, the arrangement of disposing them in the 180° intermediate sections of the channel is particularly spacesaving and well protected. The heat recapturing device exchanges heat between the exhaust air and the intake air, whereby it withdraws heat from the exhaust air and transfers it to the intake air. In the case of this heat, we are dealing with noticeable heat, such as possibly also heat from humidity. The make-up of the storage mass may be of a type known per se. It has channels penetrating it axially, through which the intake air and the exhaust air flow in counterdirection.

As a result of the heat recapturing device, a considerable portion of the heat carried along with the exhaust air may be recaptured by transferring it to the intake air. This is particularly important in the case of operation during the winter. In the summer operation and in the transition time between winter and summer, therefore in the spring and fall, no heat recapturing is necessary or only from time to time. The heat recapturing device of the invention permits further developments in a simple manner at only little cost which make its reversal possible in such a way that the heat exchange between exhaust air and intake air is prevented entirely or significantly during the continued ventilation operation and/or the ventilation is increased in the case of entirely or significantly prevented heat exchange.

For a complete or almost complete prevention of the heat exchange between exhaust air and intake air, provision may be made according to a further development of the invention that the intake air channel between the storage mass ring and the fan wheel has a lockable, additional inlet for the intake air and/or that the exhaust air channel between the fan wheel and the storage mass ring has a lockable additional outlet for the exhaust air. Each of these two measures by itself already permits complete or extensive turning off of the heat exchange between the exhaust air and the intake air. However, preferably both measures may be provided simultaneously, since as a result of that, among other things, the flow losses will be lowered in both channels.

In the case of an opened additional inlet, the fan wheel disposed in the intake air channel sucks in the intake air through this additional inlet and no longer or only to an insignificant extent through the storage mass, since the latter has a relatively high flow resistance. Correspondingly, the fan wheel located in the exhaust air channel blows the exhaust air completely or significantly out through the additional outlet, whenever the latter is opened. Therefore, no blocking of the storage mass itself against penetration of air is necessary, since the storage mass will only be flown through, if at all, to an insignificant extent by the exhaust air or intake air because of its flow resistance in the case of an open additional outlet for the exhaust air or in the case of the opened additional inlet for the intake air. To save energy, it will therefore be possible then also to switch off the possibly existing driving motor of the storage mass ring. However, it possibly may also be provided that the storage mass in the case of an opened additional outlet or additional inlet on the side of the air will be completely closed against a flow of exhaust air or a flow of intake air, for example, by means of flaps. However, this additional expenditure is generally not necessary, but it is constructionally simple and also more reliable in operation not to block the storage mass at the intake and exhaust air side, whenever the additional outlet or the additional inlet are opened.

Furthermore and according to an advantageous further development of the invention, it may be provided that the fan wheel located in the intake air channel may be swivelled by 180° into a position serving for the conveyance of exhaust air. This fan wheel then conveys in this swivelled position no intake air, but likewise exhaust air, as a result of which during operation in the summer and possibly also in the transitional operation, the ventilation of the one room or of several rooms aired by this heat recapturing device, will be considerably increased then by conveying approximately double the exhaust air quantity by means of this heat recapturing device. It then conveys no intake air into the one or several pertinent rooms, so that then the intake air flows in through other openings or through opened windows, door slits or the like.

Whenever the heat recapturing device is set for transitional or summer operation by opening of the additional outlet and/or additional inlet, the power consumption and therewith also the operating costs of the one or several fans will also be reduced, since the latter do no longer have to convey the air right through the storage mass. This saving of performance may be increased even more through the fact that one provides that the number of rotations of at least one fan wheel is adjustable, preferably that it will be driven by a pole-changeable motor. The adjustment of the number of rotations at the same time may be coupled with the opening and closing of the pertinent additional inlet or additional outlet so that in the case of an opened additional inlet or additional outlet, the number of rotations of the pertinent fan wheel is decreased automatically for the decrease of the power consumption. Because of the much smaller flow resistance, the conveying capacity of the fan wheel is nevertheless high.

In the drawing, an embodiment of the invention is shown by way of example.

The only illustration shows in a schematic, cut side view, a roof 10 of a large building space, into which roof 10, a regenerative heat recapturing device 11 installed perpendicularly according to an embodiment of the invention by way of example. In the case of the space to be ventilated and limited on the topside by said roof 10 by the heat recapturing device 11 alone or in connection with additional heat recapturing devices of this type, for example, we may deal with a larger space used for manufacturing purposes, a sports auditorium or some other space.

On the outside, the heat recapturing device 11 has a mushroomlike shape and has an exhaust air channel 12 and an intake air channel 13 which are disposed and developed essentially symmetrically in relation to one another. Each of the two channels 12, 13 always has two terminal channel sections 12a, 12c or 13a, 13c which are straight and parallel to one another and which are interconnected always by a 180° intermediate channel section 12b, 13b in such a way that the exhaust air channel 12 as well as the intake air channel 13 have practically hairpin-shaped courses. Both channels 12, 13 each contain a radial fan 40, 41.

The housing of the heat recapturing device 11 has a pot-shaped hood 14 which may have a round, rectangularly shaped or square or any other suitable circumference, and the roof 15 parallel to the roof 10 is flat and not permeable by air. Into this hood 14, a perpendicular, middle separating wall 16 dividing it as well as the perpendicular connecting pieces 17 and 26 into approximately two equal halves, is inserted which completely separates the intake air channel 13 from the exhaust air channel 12. This separating wall 16 is flat with the exception of a slight bulge 16'. This separating wall 16 connected firmly with the hood 14 therefore also penetrates the central, perpendicular in its cross section, circularly round connecting piece 17 and is extended only downwards in it by way of the hood 14 and subdivides it into two terminal sections of the channel 13a, 12a for the intake air and the exhaust air.

This connecting piece 17 having the outlet opening 56 of the intake air channel 13 and the inlet opening 55 of the exhaust air channel 12 at the lower end penetrates a circularly round roof opening 18 projecting a short piece downwards from it and is firmly disposed at the roof 10 and carries the entire heat recapturing device 11.

The hood 14 terminates at a distance above the roof 10, so that as a result of the interval between its lower edge 19 and the roof 10, intake air may flow from the outside atmosphere into the intake air inlet 71 of the terminal section 13c of the channel of the pertinent half of the hood, or exhaust air may flow out of the exhaust air outlet 70 of the terminal section 12c of the channel of the other half of the hood into the outside atmosphere.

The upper area of the connecting piece 17 penetrates the middle opening of a storage mass ring 20 rotatable with a perpendicular rotational axle, which consists essentially of a ring of a storage mass 21 through which intake air and exhaust air may flow axially for the purpose of recapturing heat. The intake air and the exhaust air always flow through approximately one half of the storage mass 21. This storage mass ring 20 has a round air-impermeable inside jacket 22 and a round air permeable outside jacket 23 which hold the ring made of storage mass 21 between themselves and are connected with one another by radial bridges. The inside jacket 22 is mounted on supporting rollers 24 held on the connecting piece 17, the rotational axes of which are horizontal, which supporting rollers carry this storage mass ring 20. Supporting rollers 25 with vertical rotational axes serve for the radial safety of the support of this storage mass ring 20, which rollers are supported likewise by the connecting piece 17 and, projecting through narrow slits in the peripheral wall of the connecting piece 17, fit against the inside jacket 22 of the storage ring 20 for the purpose of its radial safety of support. The storage mass ring 20 is driven by an electric motor, not shown, disposed in the hood 14, for example, by way of a traction mechanism gear or a friction wheel gear in such a way that it rotates slowly around its perpendicular rotational axis and to be sure with a few revolutions per minute for the purpose of recapturing heat.

At the upper end of the straight connecting piece 17, an extension connecting piece 26 which is rectangular in its cross section has been connected by way of a connecting flange 27 as a result of which the separating wall 16 also passes through diametrically and which extends up to the roof 15 of the hood and which is at a distance on all sides from the outside peripheral wall of the hood 14. As mentioned, the vertical separating wall 16 subdivides the hood 14 into two completely separated halves for the intake air and the exhaust air, it extends therefore also on the outside of the connecting pieces 26 and 17 up to the peripheral wall of the hood 14.

In the two plane walls 30, 31 which are diametrically opposed to one another of this extension connecting piece 26, there is always one circular opening 32, 33, whereby the opening 33 is formed by an elastic, annular lip 31' in order to permit the swivelling of the fan 41. The outside peripheries of inflow nozzles 34 of the radial fans 40, 41 which have no guide housing fit against the edges of these openings 32, 33. In this case, these radial fans 40, 41 consist only of the motor 35, the running gears 37, 37' driven by the former and the flow-in nozzles 34. The electric motors 35 of these radial fans 40, 41 have horizontal rotational axes aligned with one another and their shaft pins 36 carry the fan wheels, that is to say running wheels 37, 37'. The nozzles 34 are held by means of props on the front sides of the housings of the electric motors 35 facing away from the shaft pins 36. As shown, the air exit openings of the running wheels 37, 37' lead freely into the intake air channel 13 or the exhaust air channel 12, so that they do not blow out into spiral conducting housings customary otherwise in the case of radial fans, but blow out freely into the exhaust air channel 12 or the intake air channel 13 which, from a constructional point of view, is simpler and more cost effective and which also results in slight development of noise, slight dynamic losses and great voluminous streams and also a more even flow against the area of the storage mass always located downstream, than in the case of the presence of spiral-shaped guide housings. At the same time, the areas adjacent to the running gear 37 or 37', of the roof and side walls of the exhaust air or of the intake air channel 12 or 13 form a housing for the running gear 37 or 37' which is open downwards and which has, for example, approximately rectangular cross sections. However, it may also be provided, whenever for example higher blowing speeds are desired, to dispose the running gear 37 and/or 37' in a customary guide housing, such as a spiral guide housing or a squareshaped guide housing together with which it is inserted as one construction unit into the exhaust air or intake air channel which construction unit thus corresponds to a customary radial fan.

The nozzles 34 lead into the flow-in openings of the running gears 37, 37'. In the drawing, the fan 41 located in the intake air channel 13 is in the position serving for the conveyance of intake air in the direction of the fully drawn arrows. However, it is mounted swivelable altogether around a horizontal swivelling axis 38 pointed perpendicularly in relation to its rotational axis by 180° in the direction of the double arrow 39 so that it may be swivelled out of the illustrated position into a position which is deflected by a 180° angle, in which position then its direction of conveyance is the reverse, and it then conveys exhaust air instead of intake air. In order to make this swiveling possible, the middle separating wall 16 may have the bulge 16' circularly, arch-shaped in its cross section. This swiveling of the fan 41 may take place, for example, by means of an electric adjusting motor which may be disposed on the side wall 31 carrying said motor, or by hand by means of a lever, a tackle or the like. The position of the fan 41 swiveled by 180° is indicated with a dash dot line.

The outside jacket 23 of the storage mass ring 20 has two flanges directed outward which overlap above and below for the purpose of sealing an intermediate bottom 46 inserted into the hood and accommodating the storage mass ring 20 in its middle, circular opening 45.

Furthermore, in the two inside wall areas of the hood 14 lying opposite the separating wall 16, closable air passage openings 50, 51 are disposed. To be sure, these are wide and high air passage openings 50, 51 which are located above the storage mass ring 20 opposite the fans 40, 41 and may be opened and closed always by a swivelable exposing flap 52, 53. These two exposing flaps 52, 53 are swivelably articulated at their upper edges to the hood 14. These two flaps 52, 53 may be swiveled by the likewise not illustrated electric adjusting motors into their locking positions shown in fully drawn lines. As has already been mentioned and if desirable, this swiveling may be coupled with an adjustment of the number of rotations, i.e. the rpm, of the fans 40, 41, in case that their driving motors are capable of adjusting the rpm. The highest rpms are then set whenever the flaps 52, 53 are in their locking positions.

The manner of operation of this heat recapturing device 10 is as follows: In the heat recapturing operation, therefore, especially in case of operation in the winter, the two flaps 52, 53 are closed and the intake air fan 41 is swiveled into the position shown in the drawing. Because of the closed flap 53, as shown by the fully drawn arrows, the entire intake air flows through the gap 57 located on the left-hand side of the separating wall 16 between the hood 14 and the roof 10 into the terminal section 13c of the channel leading perpendicularly upwards, being straight and beginning at the lower edge of this left half of the hood 14, and flows axially in this channel section through the half of the rotating storage mass 21 always located in it and absorbs from it noticeable heat and possibly heat from humidity. The intake air conveyed by the fan 41 then flows through the 180° intermediate section 13b of the channel which may be imagined as beginning here and again terminating at the level of the flange 27. This intake air flows in the section 13b of the channel through the running gear 37' of the radial fan 41 conveying said air and then flows in a perpendicularly downward leading direction until it flows out from the outlet opening 56 of the left half of the connecting piece 17 and thus from the intake air channel 13. The outflow opening 56 of the intake air channel 13 may be closed in this embodiment by way of example by means of a flap 60 located normally in its fully drawn, shown open position by swiveling it into its dash-dot line closing position, whenever this heat recapturing device 11 is switched off.

As shown by the fully drawn flow arrows, the exhaust air is sucked in through the outlet air fan 40 into the right half of the connecting piece 17 leading perpendicularly upwards, therefore into the terminal section 12a of the channel and flows then into the 180° intermediate section 12b of the channel which in this embodiment by way of example may again be imagined as terminating and beginning at the level of the flange 27. This exhaust air at the same time flows through the running gear 37 of the fan 40 and starting out from it, it flows then downwards, axially through the pertinent half of the storage mass 21 and reaches the atmosphere through the gap 58 between the right half of the hood 14 and the roof 10. The exhaust air transmits heat to the storage mass 21.

In order to avoid the short circuit between the intake air and the exhaust air, the middle separating wall 16 somewhat projects out downwards from the connecting piece 17.

The exhaust air inlet 55, too, may be locked by a locking flap 61 which normally is in its open position as shown, and only when the fan 40 is switched off, it is swiveled into the closed position shown with a dash dot line. These two locking flaps 60, 61 may be opened and closed by a common adjusting motor, preferably automatically, following the turning on and turning off of the fans 40, 41.

Whenever ventilation only and no heat transfer between the exhaust air and the intake air is necessary, therefore, especially from time to time in the transition operation and in the case of summer operation, the two flaps 52, 53 are opened. Then, the intake air and the exhaust air flows almost exclusively through the openings 51 and 50 bypassing the storage mass 20, as indicated by the dash dot flow arrows. To be sure, in that case, practically the entire intake air and exhaust air is sucked in or blown out through the air passage openings 51 and 50, since their flow resistances are negligibly small as compared to the flow resistance of the storage mass 20 in the intake air channel 13 and exhaust air channel 12. It is therefore not necessary to close the storage mass 20 on the air side. Nevertheless, practically no heat exchange takes place between the intake air and the exhaust air, even whenever the storage mass ring 20 would rotate. Also in the case of opened flaps 52, 53, it will be possible to stop the storage mass ring 20 in order to save operating costs and lessen the wear.

In order to increase the ventilation during the summer operation in the building space 64 adjoining the roof 10 at the bottom side, it will be possible in the case of the heat recapturing device 11 shown, to reverse the intake air fan 41 to conveyance of exhaust air, by swiveling it according to the arrow 39 altogether inclusive of the nozzle 34 into the position swiveled by 180° in which it now sucks in exhaust air from the room 64 and, as indicated by the dash-two-dot flow arrow, blows out through the air passage opening 51 bypassing the storage mass 21 directly into the open air. Also in the case of the continuous exhaust air channel 12, the flap 52 is then opened and the fan 40 then likewise conveys exhaust air passed the storage mass 21 directly into the open air. As a result of that, the ventilation is not merely increased, but in the case of radial fans with blades bent backwards, the performance reception of the motors 35 will also be decreased, therefore their operating costs will be decreased which may be a particularly significant lowering of the operating costs whenever, as mentioned, one reduces thereby also the rpms of these two fans 40, 41.

The opening and closing of the flap 53 or of both flaps 52, 53 may be coupled with the 180° swiveling movement of the fan 41, whereby during summer operation, both fans may convey exhaust air through the opened flaps 52, 53 while bypassing the storage mass 21.

In some cases, the drive of the storage mass ring 20 may take place also by the air current instead of by a motor. And to be sure in this embodiment by way of example through the air current emerging from the fan wheel 37 by the fact that this air current enters into the storage mass 21 with a speed component directed at the peripheral direction of the storage mass ring 20. In consequence of the reversal of the air into the channels of the storage mass 21 in an axial direction, there develops an impulse which puts the storage mass ring 20 into rotation. Furthermore, it will be possible that the rotational directions of both fans 40, 41 are synchronized with one another in such a way that whenever both fans 40, 41 convey exhaust air, the peripheral components of the exit speed balance out the rotation of the storage mass so that the latter in this case then does not rotate.

The arrangement of the electric motor 35 of the fans 40, 41, as shown, has also the advantage that their heat in the case of the intake air fan 41 is fed directly to the intake air and in the case of the exhaust air fan 40. it is fed indirectly to the intake air by way of the storage mass 21 and thus is obtained as usable heat.

I claim:

1. A regenerative heat recapturing device for vertical insertion into the roof of a building or of something similiar for the ventilation of space and recapture of heat, which heat recapturing device comprises a rotatingly drivable storage mass through which air may flow axially, means defining an air intake channel and an exhaust air channel, said mass being located partly in said intake air channel and partly in said exhaust air channel of the heat recapturing device, respective fan means disposed in each of said intake air channel and said exhaust air channel, for the conveyance of the intake air and of the exhaust air, and wherein said storage mass is disposed in a storage mass ring, through the middle opening of which an upstream section of the exhaust air channel and a downstream section of the intake air channel lead through axially, through which exhaust air and intake air may flow in counterdirection, wherein the upstream exhaust air channel section is connected by way of a 180° intermediate channel section (12b) with a downstream channel section of the exhaust air channel containing storage mass of the storage mass ring and the downstream section of the intake air channel is connected by way of a 180° intermediate channel section with an upstream channel section of the intake air channel containing storage mass of the storage mass ring, and wherein said fan means located in the intake air channel is swivelable by 180° into a poistion serving for the conveyance of exhaust air.

2. A regenerative heat recapturing device for vertical insertion into the roof of a building or of something similar for the ventilation of space and recapture of heat, which heat recapturing device comprises a rotatingly drivable storage mass through which air may flow axially, means defining an air intake channel and an exhaust air channel, said mass being located partly in said intake air channel and partly in said exhaust air channel of the heat recapturing device, respective fan means disposed in each of said intake air channel and said exhaust air channel for the conveyance of the intake air and of the exhaust air, and wherein said storage mass is disposed in a storage mass ring, through the middle opening of which an upstream section of the exhaust air channel and a downstream section of the intake air channel lead through axially, through which exhaust air and intake air may flow in counterdirection, wherein the upstream exhaust air channel section is connected by way of a 180° intermediate channel section with a downstream channel section of the exhaust air channel containing storage mass of the storage mass ring and the downstream section of the intake air channel is connected by way of a 180° intermediate channel section with an upstream channel section of the intake air channel containing storage mass of the storage mass ring, and wherein the intake air channel between the storage mass ring and the fan means therein has a lockable additional inlet for intake air which might possibly also serve as an outlet for exhaust air and/or the exhaust air channel has a lockable additional outlet for exhaust air between the fans means therein and the storage mass ring.

3. A heat recapturing device as in claim 1, wherein said fan means are disposed in the two 180° intermediate channel sections.

4. A heat recapturing device as in claim 1, wherein the rpm of at least one fan means is adjustable, and the fan means are driven by pole-reversible motors.

5. Heat recapturing device as in claim 1. characterized in that the rpm of at least one fan wheel is adjustable, preferably the fan wheels are driven by pole-reversable motors.

6. A heat recapturing device as in clam 1, wherein the storage mass ring is carried by means of carrier rolls fitting against its underside and is radially supported by supporting rolls fitting against its inside jacket.

7. A heat recapturing device as in claim 1, further comprising a hood to be disposed at a distance above the roof which is subdivided by a middle separating wall into two halves for the intake air and the exhaust air and within which the storage mass ring is located.

8. A heat recapturing device as in claim 1, wherein the exhaust and intake air channel sections penetrating the central opening of the storage mass ring are disposed in a central connecting piece which projects downwards over a standard intake air inlet and a standard exhaust air outlet for insertion into a roof opening and which also serves for the carrying of the heat recapturing device.

9. A heat recapturing device as in claim 1, wherein said fan means include respective electric motors which drive respective fan wheels of said fan means, said electric motors and said fan wheels being respectively disposed in the intake air channel and the exhaust air channel.

10. A heat recapturing device as in claim 1, wherein said fan means are radial fans.

11. A heat recapturing device as in claim 10 wherein said radial fans have air exit openings which freely empty into the respective intake air channel and the exhaust air channel so that these radial fans are disposed to freely blow out into the intake air or exhaust air channel.

* * * * *